United States Patent [19]

Frank et al.

[11] Patent Number: 5,353,644
[45] Date of Patent: Oct. 11, 1994

[54] METHOD AND SYSTEM FOR EVALUATING A SIGNAL FROM A VIBRATIONALLY-SENSITIVE PRESSURE SENSOR IN A MOTOR VEHICLE

[75] Inventors: Rainer Frank, Sachsenheim; Alfred Kratt, Schweiberdingen; Manfred Mezger, Markgroeningen-Unterriex; Klaus Ries-Mueller, Bad Rappenau, all of Fed. Rep. of Germany

[73] Assignee: Robert Bosch GmbH, Stuttgart, Fed. Rep. of Germany

[21] Appl. No.: 98,664

[22] Filed: Jul. 28, 1993

[30] Foreign Application Priority Data

Sep. 3, 1992 [DE] Fed. Rep. of Germany ....... 4229487

[51] Int. Cl.$^5$ .............................................. G01L 9/00
[52] U.S. Cl. ...................................... 73/714; 73/509; 73/723
[58] Field of Search ....................... 73/146.5, 146, 116, 73/115, 714, 723-728, 753, 754, 118.1, 119 A, 493, 509, 654

[56] References Cited

U.S. PATENT DOCUMENTS 3,978,731 9/1976 Reeder et al. ............... 73/861.18 X
4,984,467 1/1991 Haefner ........................... 73/727 X Primary Examiner—Richard E. Chilcot, Jr.
Assistant Examiner—Joseph L. Felber
Attorney, Agent, or Firm—Kenyon & Kenyon

[57] ABSTRACT

The signal from a vibrationally-sensitive pressure sensor is both low-pass filtered and band-pass filtered. The low-pass-filtered portion is employed as a pressure-measuring signal, while the band-pass filtered portion is used as an acceleration-measuring signal. The pressure sensor is preferably installed in the tank-venting installation of a motor vehicle to measure the pressure differential relative to the surroundings. The acceleration-measuring signal is used to stop a recognition of engine misfiring, as soon as a rough road surface is recognized as a result of this signal.

11 Claims, 3 Drawing Sheets

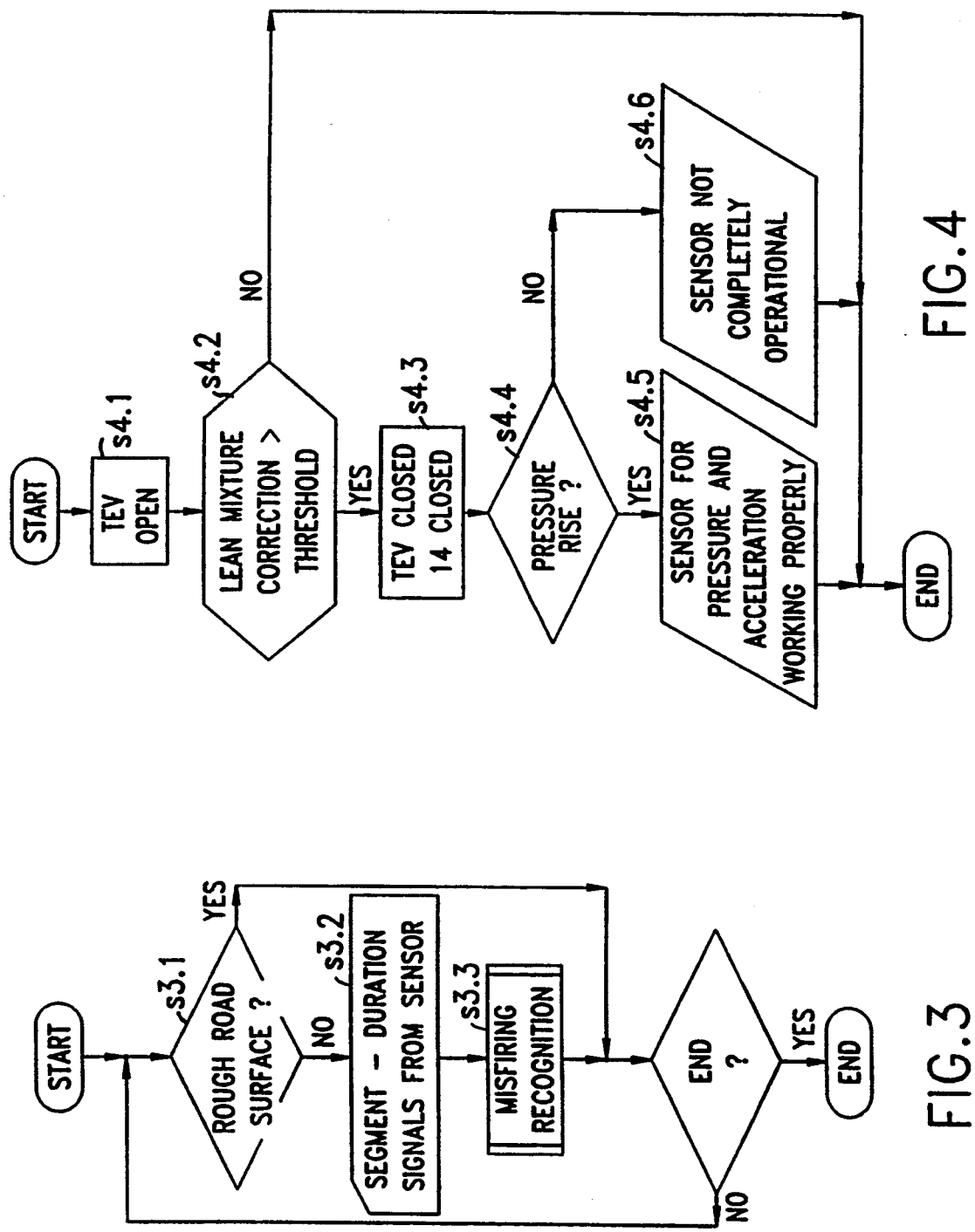

METHOD AND SYSTEM FOR EVALUATING A SIGNAL FROM A VIBRATIONALLY-SENSITIVE PRESSURE SENSOR IN A MOTOR VEHICLE

FIELD OF THE INVENTION

The present invention relates to a method and system for evaluating the signal from a pressure sensor in a motor vehicle.

BACKGROUND INFORMATION

Non-prepublished German patent application No. DE 41 25 467 describes a sensor for simultaneously determining acceleration and differential pressure. The sensor has a membrane, for example, which separates two pressure spaces from one another and has a seismic mass suspended from it. The membrane is deflected either by compressive or accelerative forces. The deflection of the membrane is converted into an electric signal. If one of the two pressure spaces is sealed, it is possible for the absolute pressure prevailing in the other compression chamber to also be measured with such a sensor.

Because of its pressure-measuring function, such a sensor is suited, for example, for monitoring a tank venting installation, and because of its acceleration-measuring function, it is suited for detecting a rough road surface. In the above-mentioned German application, the sensor is expediently installed in a motor vehicle in a way that will allow severe up and down movements of the wheels to have an especially dynamic effect on its acceleration-measuring signal.

The above-mentioned German application indicates that the system for detecting rough road surfaces can be used to stop a misfiring recognition. German Patent Application No. DE 36 10 186 indicates that a signal for detecting rough road surfaces can be used to modify the performance characteristics of an anti-lock control system.

German Patent Application No. DE 41 25 467 does not indicate, however, how one is supposed to determine whether the pressure sensor having an acceleration-measuring function is more likely to output a signal that is decisive for the pressure within a certain time period, or whether it is more likely to output a signal that is decisive for the acceleration.

SUMMARY OF THE INVENTION

The method and system according to the present invention is distinguished by the fact that the signal from the pressure sensor is low-pass filtered, on the one hand, and band-pass filtered, or only high-pass filtered, on the other hand. The low-pass filtered value is used as a pressure signal, and the band-pass filtered or high-pass filtered component is used as an acceleration signal. If the acceleration signal exceeds a threshold, a signal is output indicating that a rough road surface has been detected. The amplitude of the acceleration signal, or an average value of the rectified signal can be used, for example, to make the comparison to a threshold.

It is relatively difficult to test an acceleration sensor on a motor vehicle for operativeness, since it is hardly possible and also not recommendable to induce arbitrarily strong vibrations for the acceleration sensor to respond to. If, on the other hand, the acceleration sensor is integrated, in terms of function, into a pressure sensor, the testing is simple, since changes in pressure can be brought on relatively easily and arbitrarily. If the pressure sensor indicates the pressure changes that have been induced arbitrarily, the pressure sensor is working properly with respect to the pressure measurement. In accordance with an advantageous further development of the method according to the present invention, this result serves as an assessment that the sensor is also working properly with respect to its acceleration measuring function.

BRIEF DESCRIPTION OF THE DRAWINGS

FIG. 3 illustrates a flow chart relating to the detection of misfirings.

FIG. 4 shows a flow chart relating to a method for testing the operativeness of the vibrationally-sensitive pressure sensor.

DETAILED DESCRIPTION

Figure 1:
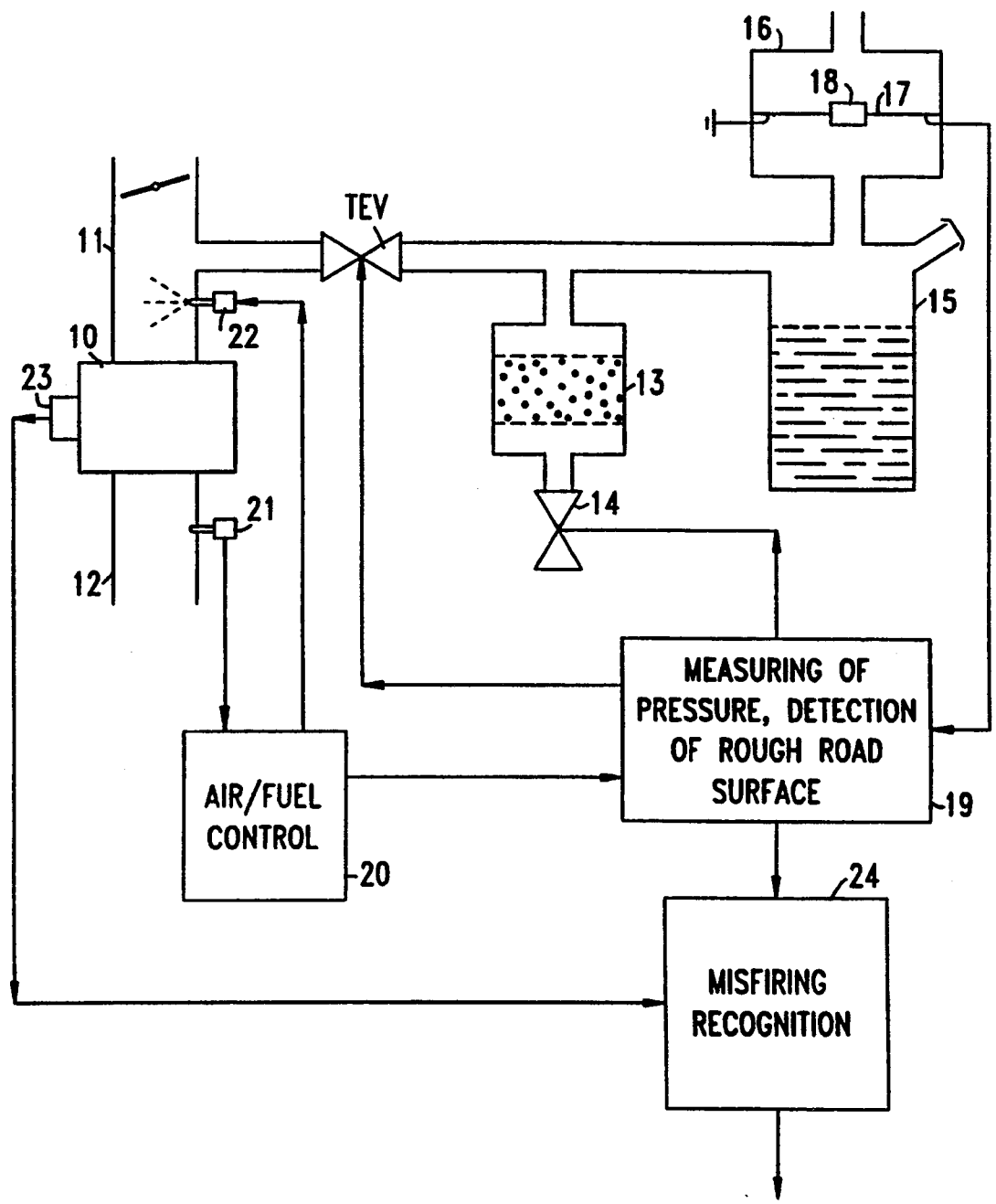
FIG. 1 depicts a block diagram of a system for diagnosing tank venting and for detecting a rough road surface given recognition of misfirings, with the aid of a single vibrationally-sensitive pressure sensor.

FIG. 1 shows, inter alia, an internal combustion engine 10 having an intake manifold 11 and an exhaust duct 12. A tank-venting installation opens through into the intake manifold 11. This tank-venting installation comprises a tank-venting valve TEV, an adsorption filter 13 with a shutoff valve 14 in its vent line, and a tank 15, which is connected to a vibrationally-sensitive pressure sensor 16. At the middle of this pressure sensor, there is a piezoelectric membrane 17 with a seismic mass 18. The pressure sensor 16 transmits a signal to a measurement/detection device 19 for measuring pressure and detecting a rough road surface.

The block 19 also receives a signal from an air/fuel control block 20, which is supplied with the signal from an oxygen probe 21 arranged in the exhaust duct 12, and which controls the injection time of an injection device 22 arranged in the intake manifold 11.

A segment-time meter 23 is mounted on the internal combustion engine 10. It measures the time spans in which the crankshaft of the engine runs through specified angular segments. With the aid of these signals, a misfiring detection takes place in a misfiring-detection block 24, employing a method as described, for example, in U.S. Pat. No. 4,044,234 (which corresponds to German No. DE 25 07 138) or U.S. Pat. No. 5,044,195.

Figure 2:
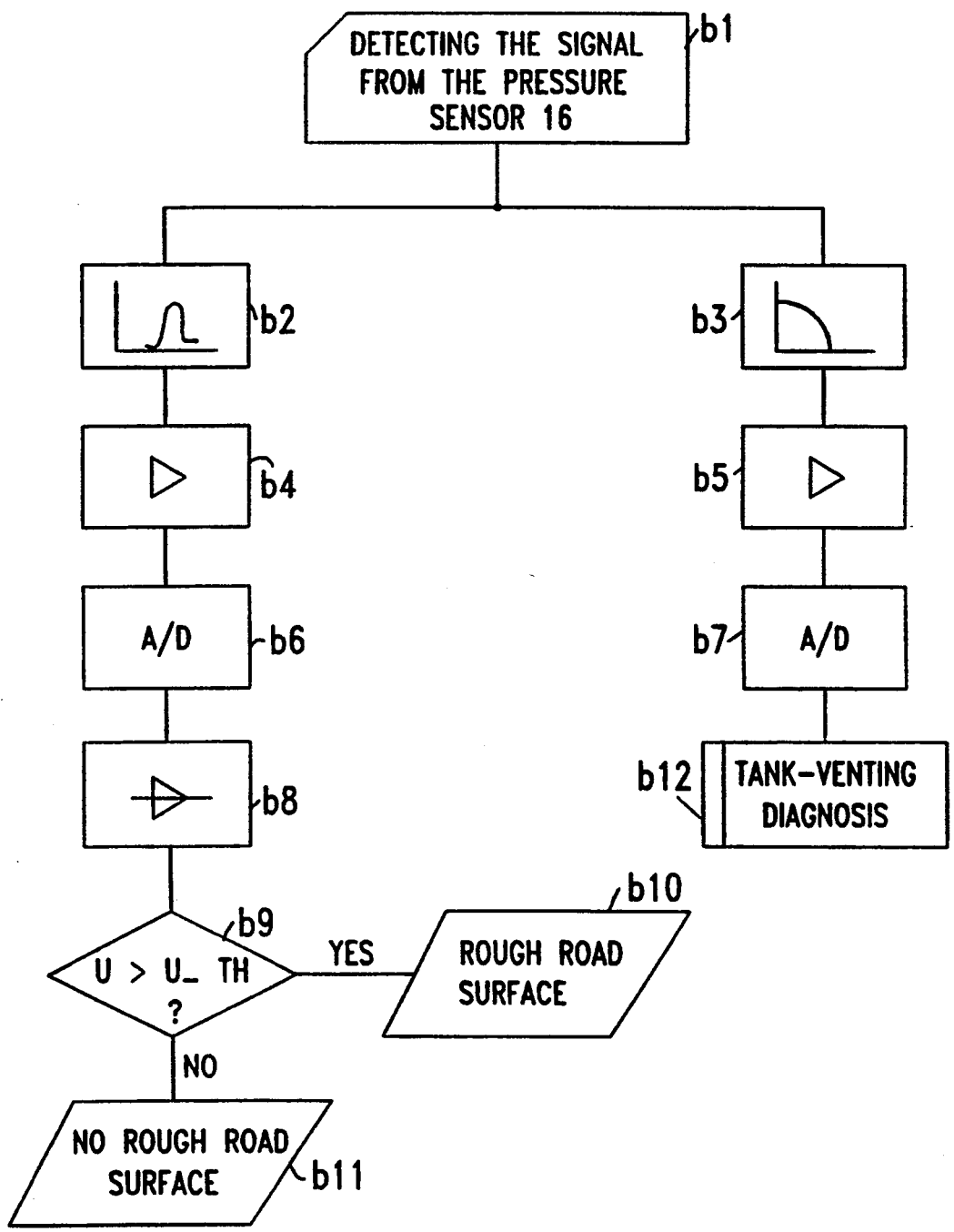
FIG. 2 shows a flow chart of a method according to the present invention for dividing the output signal from a vibrationally-sensitive pressure sensor into one pressure signal and one acceleration signal.

The block/flow chart of FIG. 2 illustrates how the output signal from the vibrationally-sensitive pressure sensor can be evaluated in a different manner. The signal is acquired from the pressure sensor 16 in a block b1. In an exemplary embodiment, this signal is fed in an analogous form both to a band-pass filter b2 in a left acceleration-measuring duct and to a low-pass filter b3 in a right pressure-measuring duct. An amplifier b4 or b5, as well as an A/D converter b6 or b7 follow in both ducts.

In the acceleration-measuring duct, the signal is then rectified in a block b8, after which a comparison block b9 checks whether or not the voltage U output by the rectifier b8 is greater than a threshold voltage U TH. If it is greater, the existence of a rough road surface is recognized. This is output in a block b10. If not, the fact that no rough road surface exists is output in block b11.

The A/D converter b7 is followed in the pressure-measuring duct by a subroutine block b12, in which a tank-venting evaluation is carried out with the help of the pressure measurement. This is achieved, for example, in that the block 19, which is provided, inter alia, for measuring pressure and for detecting a rough road surface, closes the shutoff valve 14 and opens the tank-venting valve, after which the pressure in tank 15 would have to fall off. If the pressure sensor 16 does not show such a pressure drop, this indicates that the tank-venting installation is defective.

In the depicted and described exemplary embodiment, the pressure measurement is used for the tank-venting diagnosis. However, other pressures could also be measured using the vibrationally-sensitive pressure sensor 16, for example those pressures prevailing in an exhaust-gas recirculation duct or the pressure prevailing in the intake manifold 11.

The fluid whose pressure is measured is of no particular importance to the present invention. It is also unimportant whether a differential or an absolute pressure is detected. Rather, the sole decisive factor is that the output signal from the pressure sensor is low-pass filtered, on the one hand, which leads to the pressure-measuring signal, and is filtered, on the other hand, so as at least not to allow low frequencies to pass through, which results in the acceleration-measuring signal.

Which critical frequencies are used in each case for the filtering depends upon the particular application. Frequencies of acceleration signals having a strong effect lie typically within the range of a few up to several 10 Hz. On the other hand, pressure signals in a tank-venting installation have vibration periods of a few seconds up to a few minutes. Frequencies of up to a few hertz can occur in exhaust-gas recirculating systems, whereby, however, these signals show only a disturbingly high amplitude when the pressure is measured close to where there is a branching-off from the exhaust-gas duct 12.

In the most unfavorable cases, pressure fluctuations in the intake manifold 11 can depend heavily on shocks, which act on the motor vehicle. In such an unfavorable case, it is virtually impossible to clearly distinguish which portions of the output signal from a vibrationally-sensitive pressure sensor are caused essentially by the pressure, and which are caused essentially by accelerations.

Without going into further detail, the description of FIG. 2 indicated that a rectification takes place in block b8. Preferably, this is a rectification characterized by a relatively high response sensitivity, given a rising amplitude, and characterized, however, by a reduced response sensitivity, given a falling amplitude. Reference is made to the fact that the rectification block can also be left out completely. An amplitude comparison is then made in the comparison block b9. Reference is made furthermore to the fact that amplification and A/D conversion can instead take place in the sensor, in which case filters b2 and b3 are not analog, but rather digital filters.

FIG. 3 illustrates how the detection of a rough road surface, given recognition of misfirings, as carried out in the left duct in FIG. 2, can be employed. Step s3.1 tests whether it was signalled in block b10 of FIG. 2 that a rough road surface exists. If this is the case, the recognition of misfirings is stopped. Otherwise, segment-duration signals are acquired by the segment-duration sensor 23 in a step s3.2. On the basis of these signals, a misfiring recognition is carried out in a subroutine block s3.3.

The coupling between the recognition of a rough road surface in the left duct of FIG. 2 and the misfiring recognition in accordance with FIG. 3 is conditional upon the existence of a band-pass filter b2, instead of a high-pass filter, in the left duct in FIG. 2. The reason for this is that when the motor vehicle drives over a rough road surface, a signal of a considerable amplitude, for example in the 100 Hz range, can be output by the pressure sensor 16. However, such a signal is heavily damped by the drive train of the motor vehicle so that it no longer has any effect at all at the location of the segment-duration sensor 23. If a high-pass filter were used instead of a band-pass filter, a rough road surface would be recognized and the misfiring recognition would be stopped. However, this is not at all necessary, since, as just indicated, a rough road surface, as manifested by such relatively high-frequency signals, does not interfere with the misfiring recognition. This applies correspondingly to the anti-lock control system.

On the other hand, it can suffice in other applications to use a high-pass filter instead of a band-pass filter in the duct for recognizing a rough road surface. Quite to the contrary, it can be expedient in other systems to install still additional filters, for example between blocks b9 and b10 in FIG. 2, for example to the effect that a rough road surface is recognized only when the condition of block b9 is fulfilled and, in addition, when the vehicle is traveling within a certain speed range. The misfiring recognition can then continue, for example, in the other traveling speed ranges. These ranges are selected as those for which it was determined that no difficulties arise within these ranges for the misfiring recognition.

FIG. 4 illustrates a diagnostic sequence for testing the operativeness of the vibrationally-sensitive pressure sensor 16. The tank-venting valve is opened in a step s4.1. In a step s4.2, it is tested whether the air/fuel control block 20 must perform a lean mixture correction, which is greater than a specified threshold value. If this is not the case, the diagnosis cannot follow with operational dependability and, thus, the procedure is terminated.

Otherwise, the tank-venting valve TEV and the shutoff valve 14 are closed in a step s4.3. At this point, the pressure in the tank-venting installation must rise, since fuel in this installation evaporates relatively rapidly. This had been indicated by the lean mixture correction made above the threshold value, and due to the fact that the installation is completely sealed off. If the expected pressure rise is actually established in step s4.4, the sensor, in step s4.5, is judged to be in proper working order, both with respect to its pressure-measuring capability and with respect to its acceleration-measuring capability. If this is not the case, the sensor is judged in step s4.6 to be not completely operational with respect to the above-mentioned capabilities.

What is claimed is:

1. A method for evaluating a signal from a vibrationally-sensitive pressure sensor in a motor vehicle, comprising the steps of:
   filtering the sensor signal with a low-pass filter to provide a pressure signal; and
   filtering out of the sensor signal at least one first portion of the sensor signal having a first frequency lower than a first preselected threshold frequency to provide an acceleration signal.

2. The method according to claim 1, wherein the pressure signal is indicative of a pressure of a fluid.

3. The method according to claim 1, further comprising the step of filtering out of the sensor signal at least one second portion of the sensor signal having a second frequency higher than a second preselected threshold frequency, the second preselected threshold frequency being higher than the first preselected threshold frequency.

4. The method according to claim 1, further comprising the steps of testing the pressure signal and indicating, as a function of the testing step, whether the pressure sensor is operable.

5. The method according to claim 1, further comprising the steps of comparing the acceleration signal to a third preselected threshold value, and generating a rough road surface signal when the acceleration signal exceeds the third preselected threshold value.

6. The method according to claim 5, further comprising the step of discontinuing a recognition of engine misfirings in response to the rough road surface signal.

7. The method according to claim 6, further comprising the step of detecting a differential pressure in a tank-venting installation in the motor vehicle.

8. A system for evaluating a signal from a vibrationally-sensitive pressure sensor in a motor vehicle, comprising:

a low-pass filtering device coupled to the pressure sensor for receiving the sensor signal and for providing a pressure signal as a function of the sensor signal; and an additional filtering device coupled to the pressure sensor for receiving the sensor signal and for passing through only those portions of the sensor signal having a frequency greater than a preselected threshold frequency to provide an acceleration signal.

9. The system according to claim 8, wherein the pressure sensor is disposed in a tank-venting installation in the motor vehicle.

10. The system according to claim 8, further comprising means for recognizing a rough road surface when the acceleration signal exceeds a preselected threshold value.

11. The system according to claim 10, further comprising means for stopping a misfiring recognition when a rough road surface is recognized.

* * * * *